US008135080B2

(12) United States Patent
Adachi et al.

(10) Patent No.: US 8,135,080 B2
(45) Date of Patent: Mar. 13, 2012

(54) OFDM RECEIVER APPARATUS HAVING A PLURALITY OF RECEIVER CIRCUITS AND OFDM RECEIVING METHOD

(75) Inventors: Naoto Adachi, Kawasaki (JP); Makoto Hamaminato, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 774 days.

(21) Appl. No.: 12/181,782

(22) Filed: Jul. 29, 2008

(65) Prior Publication Data

US 2009/0097576 A1    Apr. 16, 2009

(30) Foreign Application Priority Data

Oct. 10, 2007 (JP) ................. 2007-263987

(51) Int. Cl.
*H04K 1/10* (2006.01)
(52) U.S. Cl. ........ 375/260; 375/136; 375/145; 375/149; 375/316; 375/340; 375/342; 375/344; 375/350; 375/355; 375/362
(58) Field of Classification Search .................. 375/260, 375/316, 340, 342, 346–347, 354, 355, 363–366, 375/344, 350, 362
See application file for complete search history.

(56) References Cited

U.S. PATENT DOCUMENTS

| | | | | |
|---|---|---|---|---|
| 6,459,744 B1 * | 10/2002 | Helard et al. | ................. | 375/354 |
| 6,647,025 B1 * | 11/2003 | Sudo | ............. | 370/503 |
| 6,842,421 B1 * | 1/2005 | Sarraf et al. | .................. | 370/208 |
| 7,177,376 B2 * | 2/2007 | Atungsiri et al. | ............. | 375/343 |
| 7,203,244 B2 * | 4/2007 | Alcouffe | ....................... | 375/260 |
| 7,440,506 B2 * | 10/2008 | Atungsiri et al. | ............. | 375/260 |
| 7,577,087 B2 * | 8/2009 | Palin | ............................. | 370/210 |
| 7,684,313 B2 * | 3/2010 | Gold-Gavriely et al. | ..... | 370/210 |
| 7,817,738 B2 * | 10/2010 | Takeuchi et al. | ............. | 375/260 |
| 2006/0153317 A1 * | 7/2006 | Zhang et al. | .................. | 375/344 |
| 2006/0222099 A1 * | 10/2006 | Varadarajan et al. | ......... | 375/260 |
| 2006/0245349 A1 * | 11/2006 | Vrcelj et al. | .................. | 370/210 |
| 2007/0070882 A1 * | 3/2007 | Kawauchi et al. | ............. | 370/210 |
| 2009/0041167 A1 | 2/2009 | Kadota et al. | | |

FOREIGN PATENT DOCUMENTS

| | | |
|---|---|---|
| JP | 2003-143105 A | 5/2003 |
| JP | 2003-229833 A | 8/2003 |
| JP | 2004-179816 A | 6/2004 |
| JP | 2005-150935 A | 6/2005 |
| JP | 2006-229323 A | 8/2006 |
| JP | 2007-208856 A | 8/2007 |
| WO | WO-2006/099241 A1 | 9/2006 |
| WO | WO-2006/123557 A1 | 11/2006 |

OTHER PUBLICATIONS

Japanese Office Action mailed Dec. 6, 2011 for corresponding Japanese Application No. 2007-263987, with Partial English-language Translation.

* cited by examiner

*Primary Examiner* — Chieh M Fan
*Assistant Examiner* — Sophia Vlahos
(74) *Attorney, Agent, or Firm* — Fujitsu Patent Center

(57) ABSTRACT

A receiver circuit in each branch has an FFT unit that performs Fourier transform on OFDM signals. A slave branch FFT window control unit determines whether an undesired wave is a preceding wave or a delay wave, and notifies a master branch of the result. In response to the notification from the slave branch, a master branch FFT window control unit controls a position of an FFT window that indicates a time range in which Fourier transform is performed on OFDM signals.

9 Claims, 18 Drawing Sheets

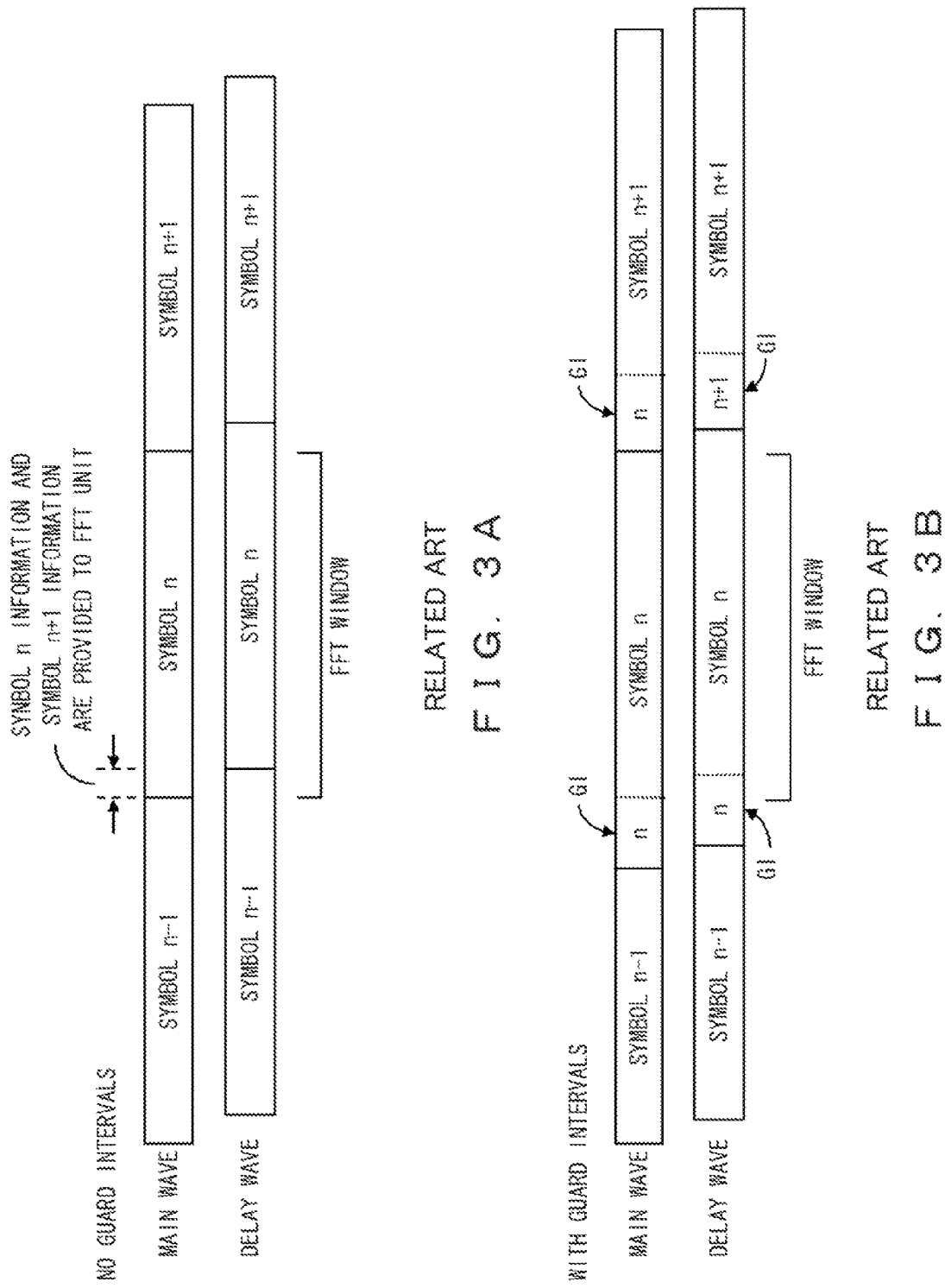

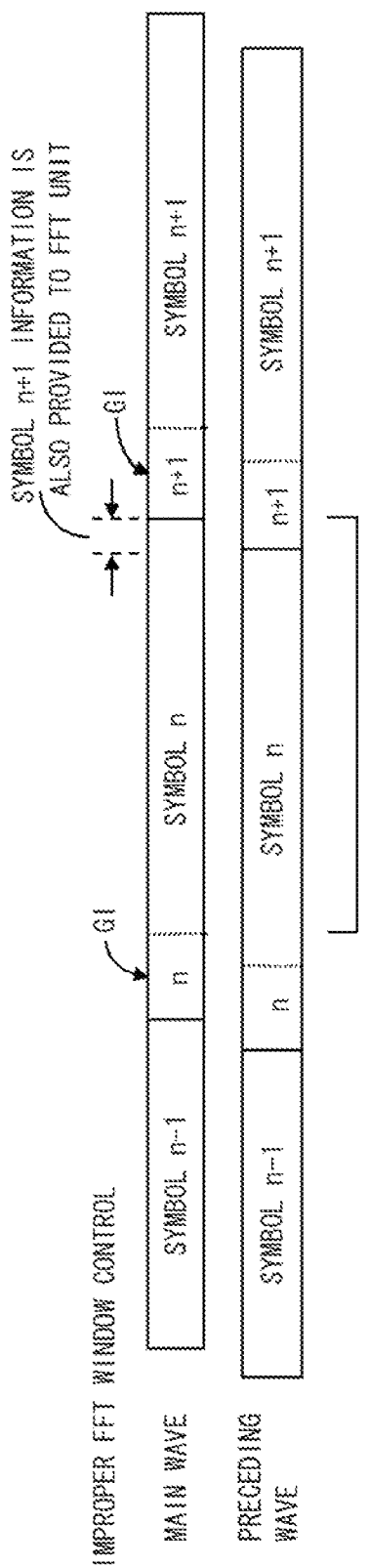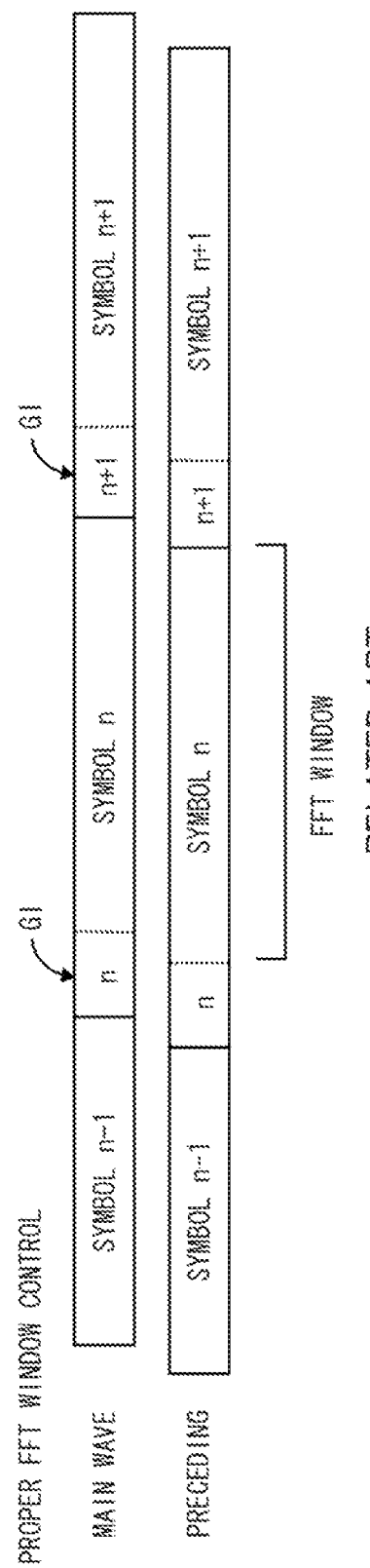

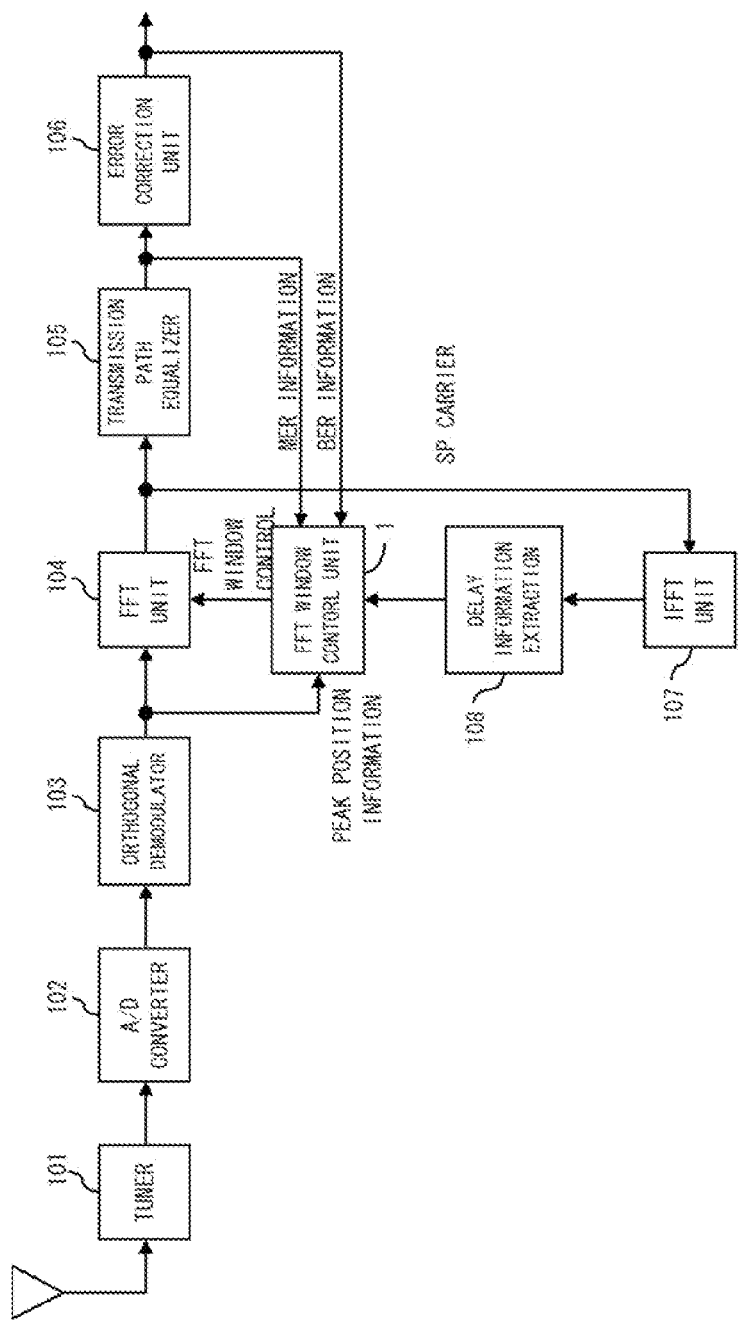
F I G. 6

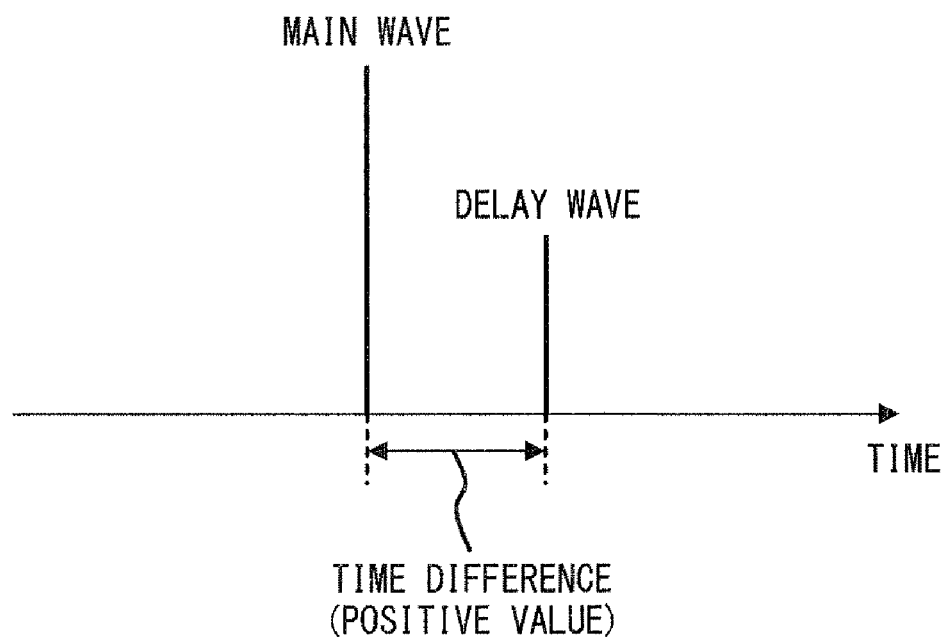
F I G. 7A
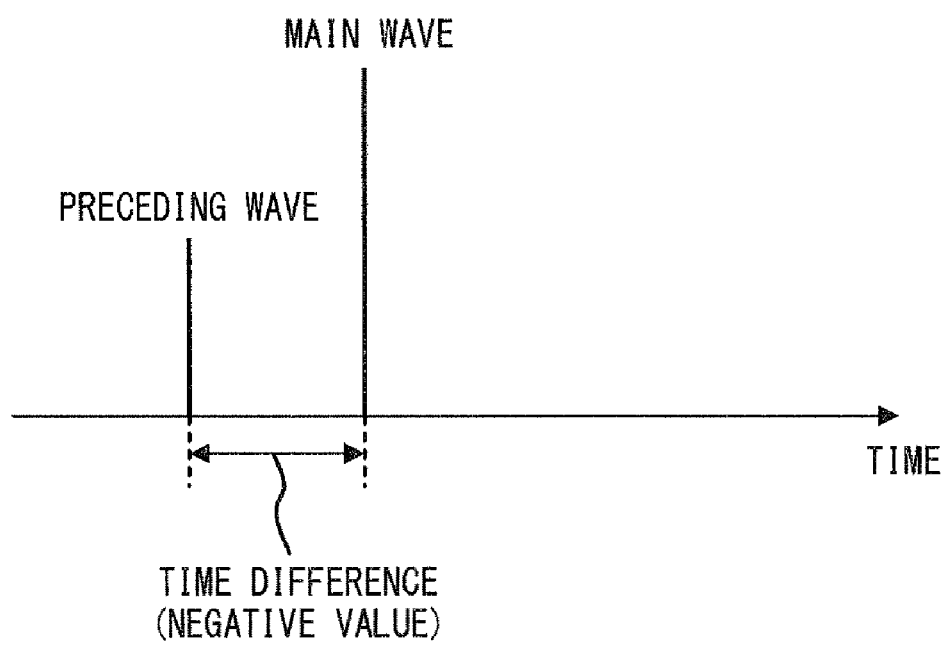
F I G. 7B

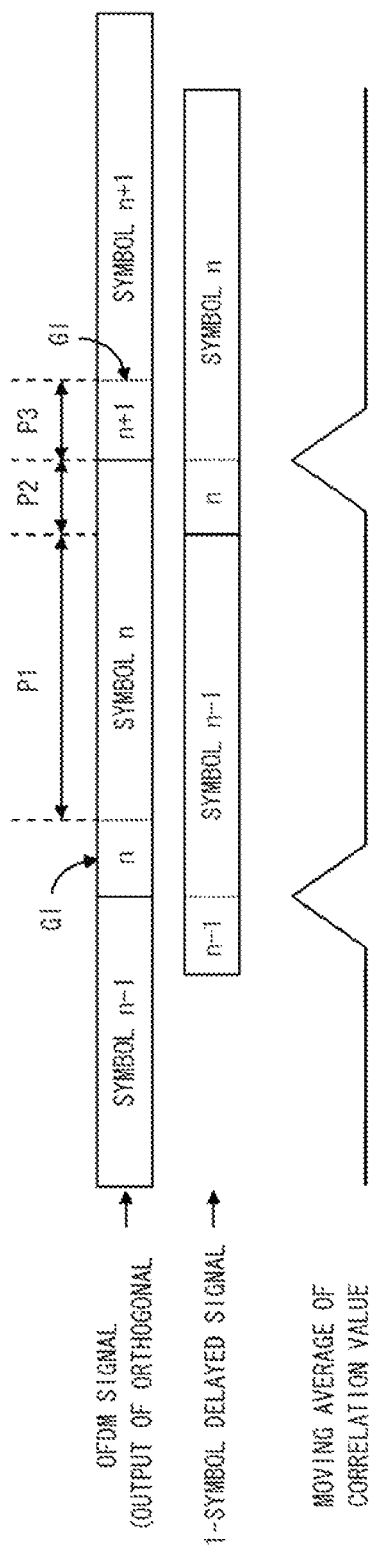
F I G. 8

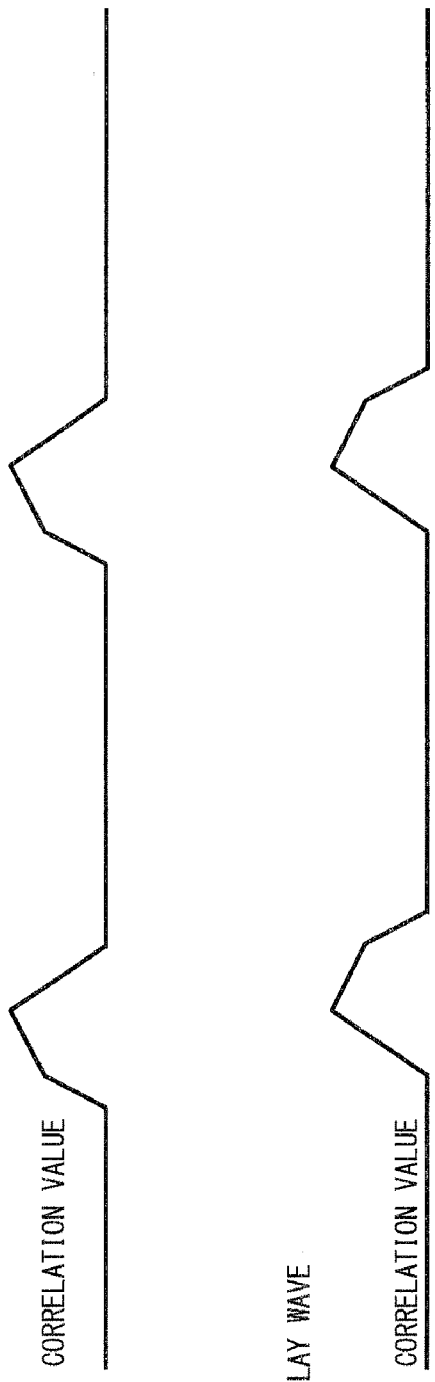
FIG. 9A  MULTIPATH WITH PRECEDING WAVE
MOVING AVERAGE OF CORRELATION VALUE
FIG. 9B  MULTIPATH WITH DELAY WAVE
MOVING AVERAGE OF CORRELATION VALUE

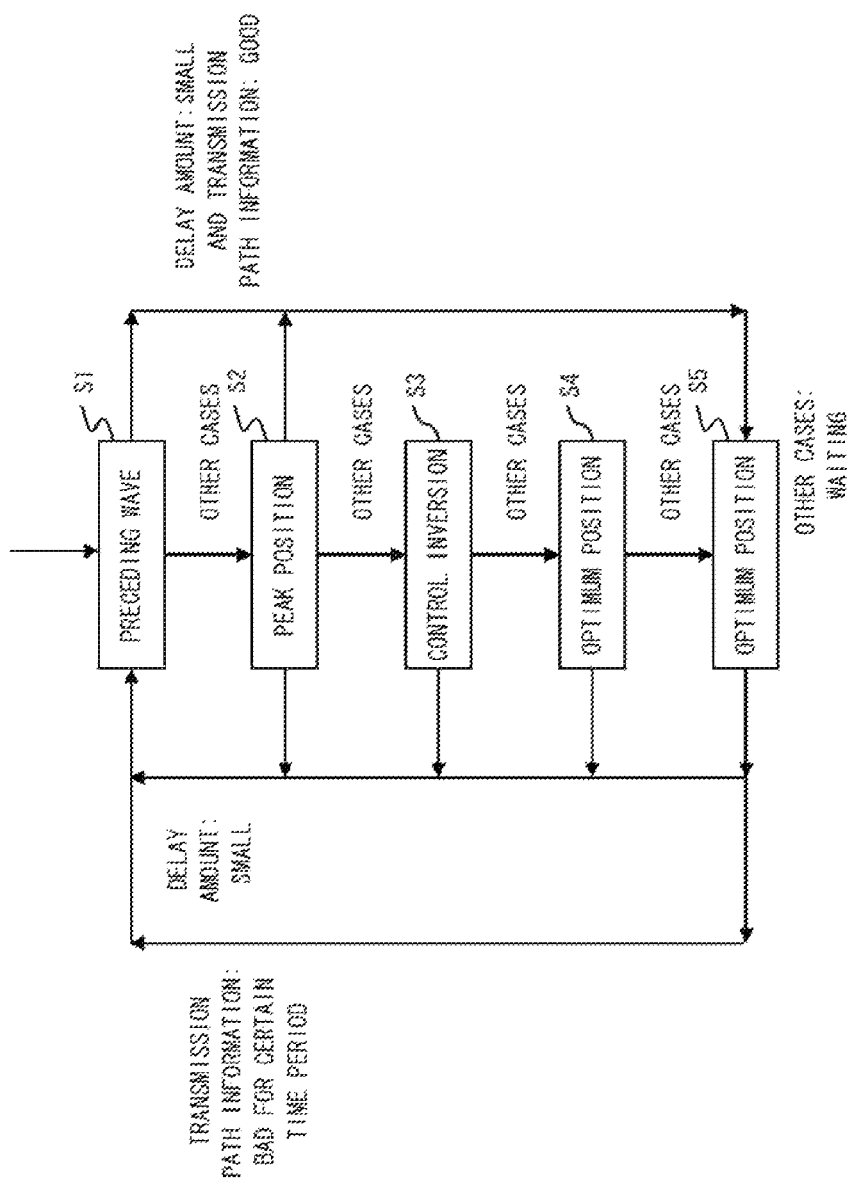

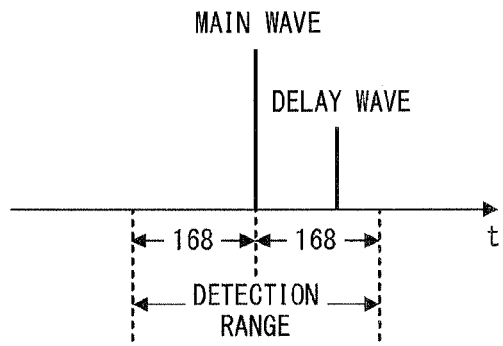
F I G. 1 1 A
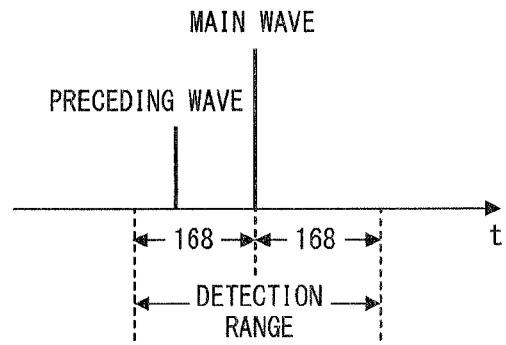
F I G. 1 1 B
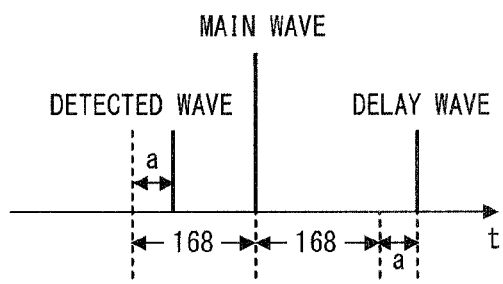
F I G. 1 1 C
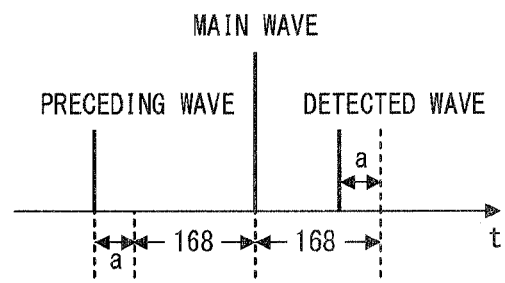
F I G. 1 1 D
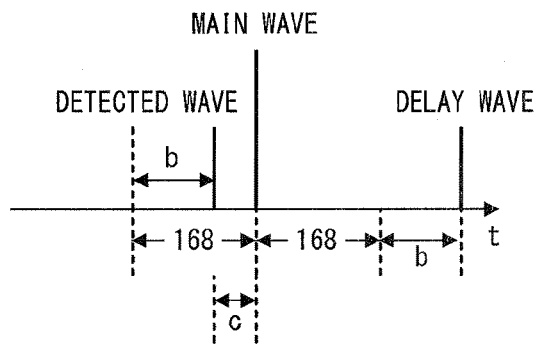
F I G. 1 1 E
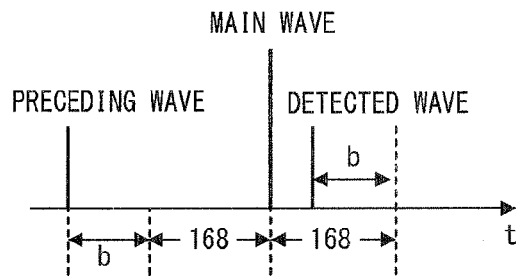
F I G. 1 1 F

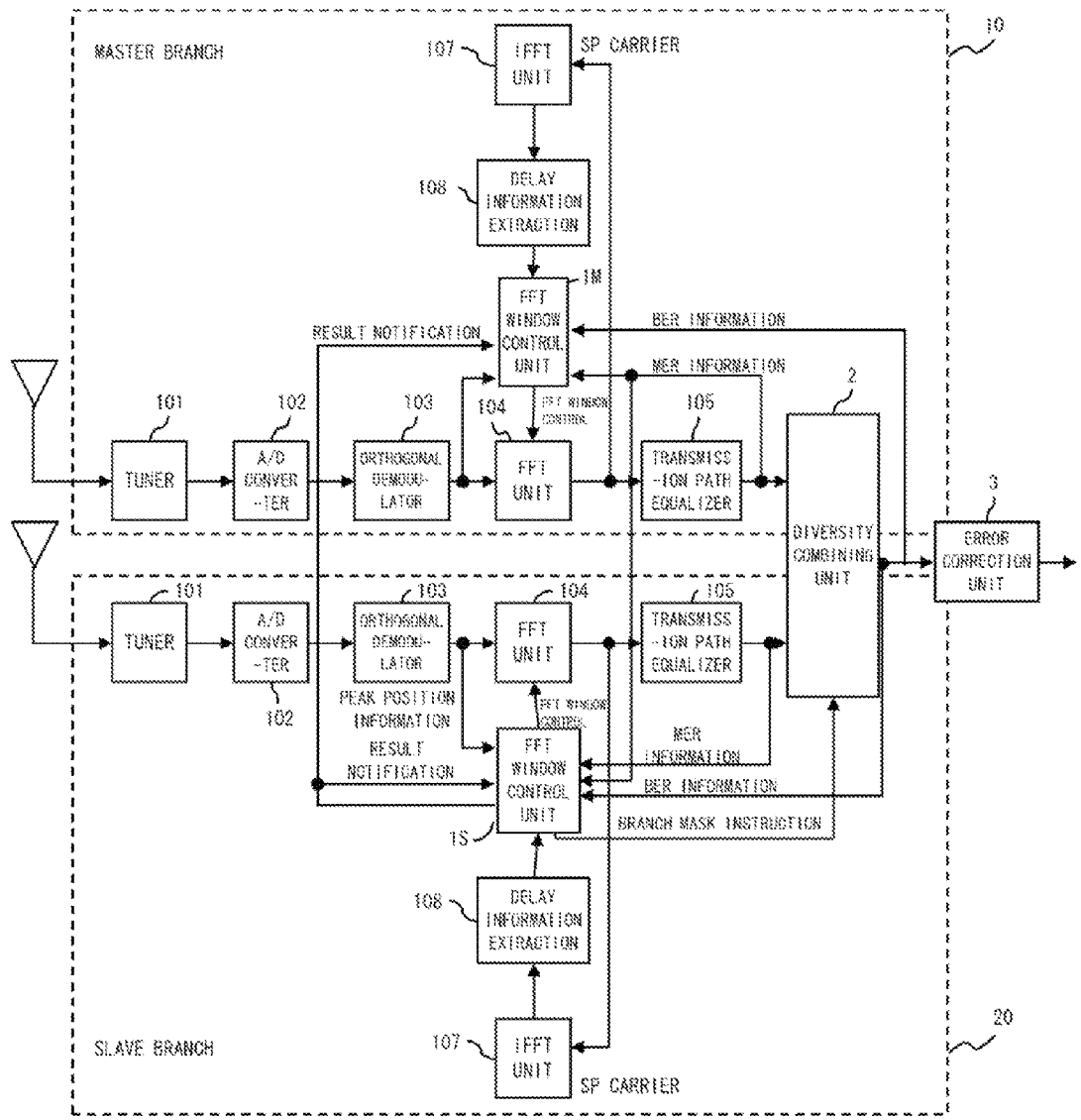
F I G. 1 2

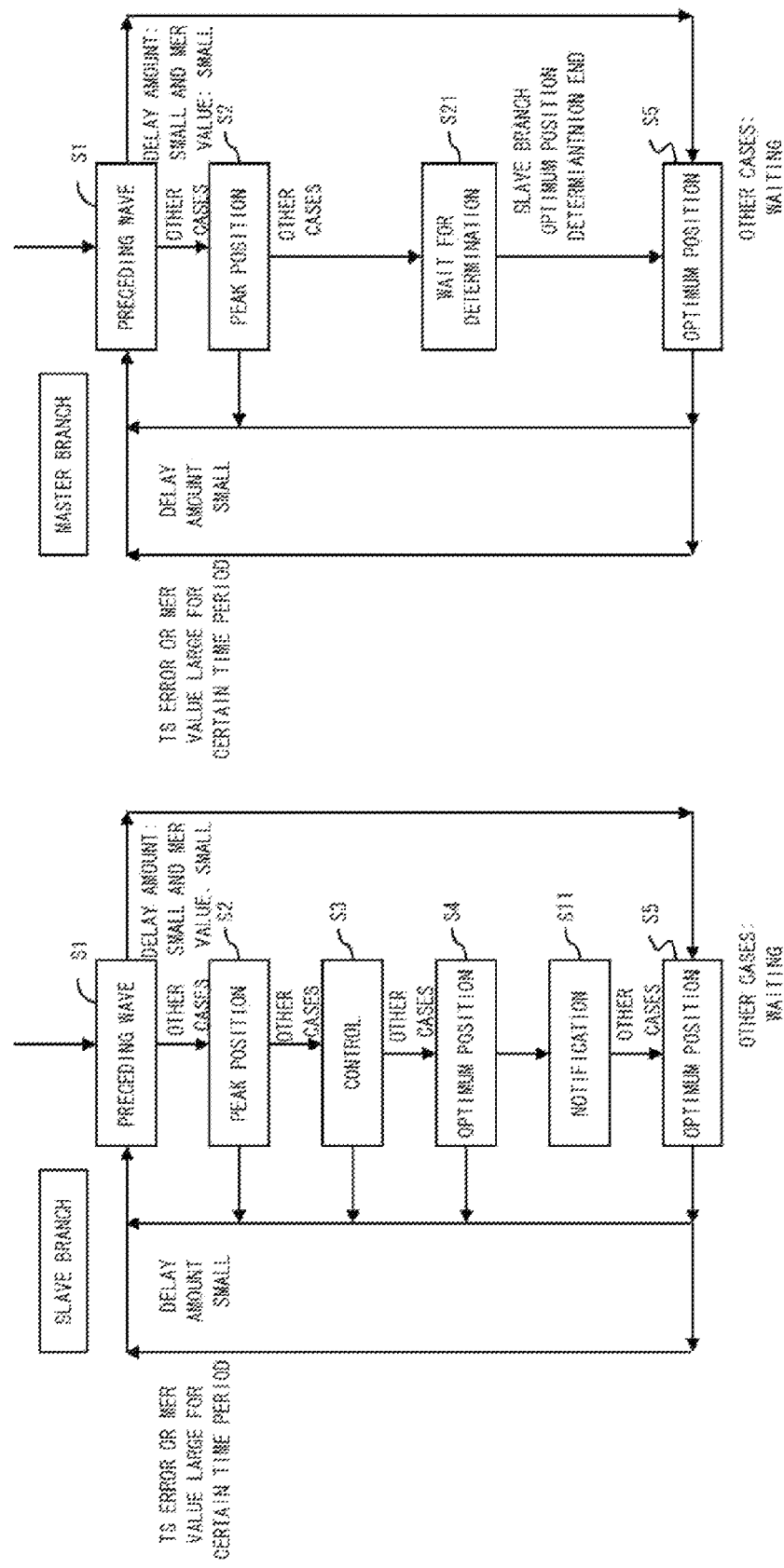

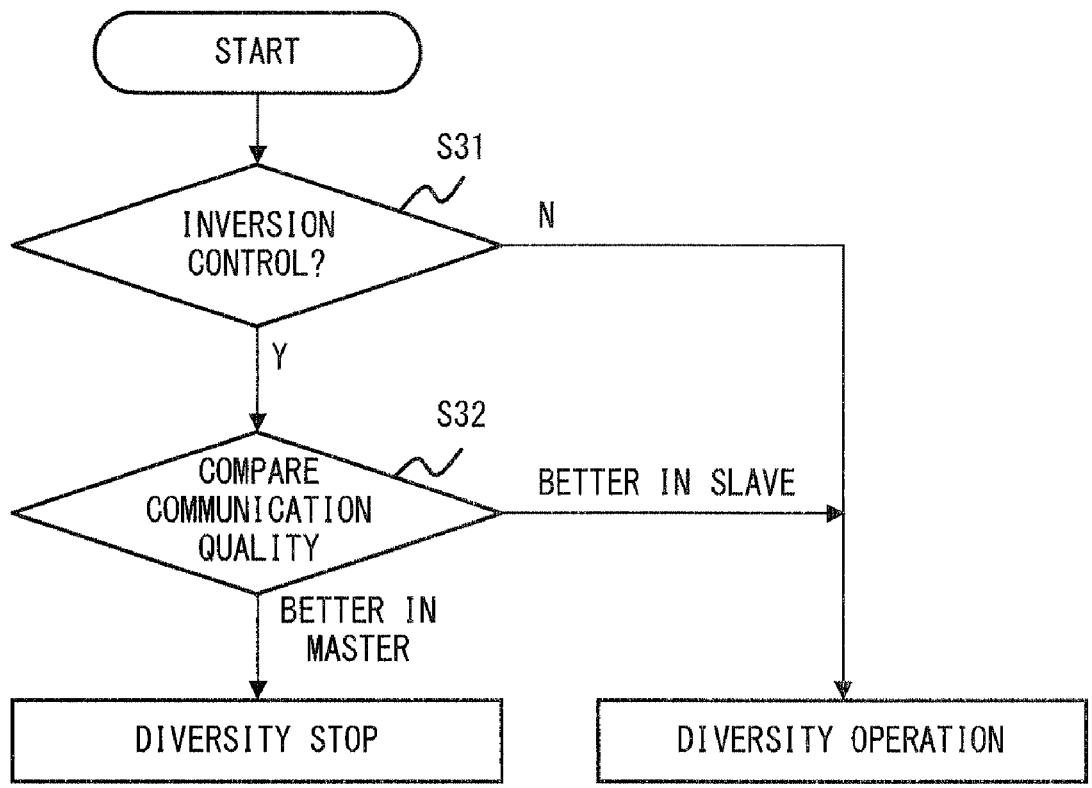
F I G. 14

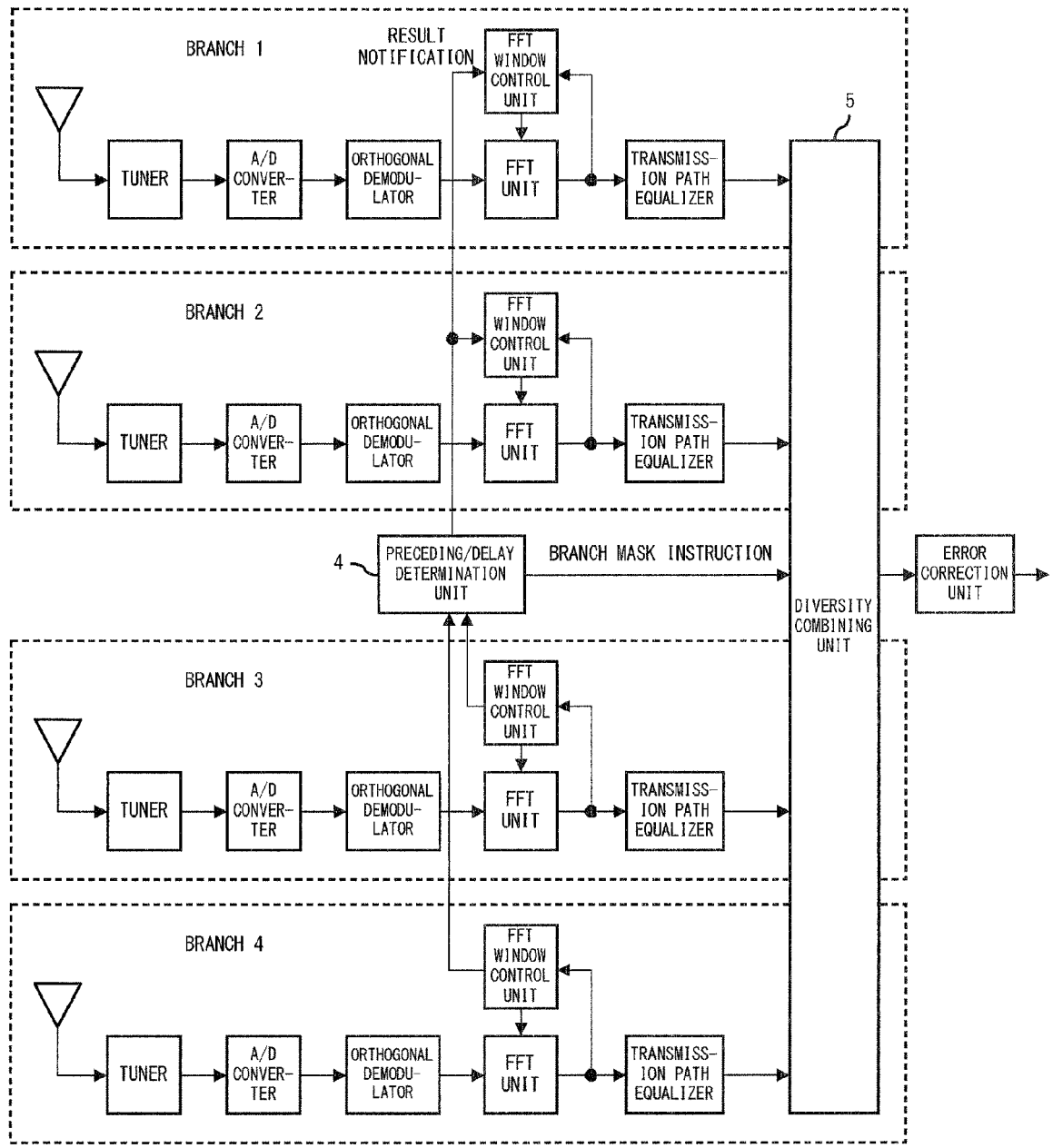
F I G. 1 5

US 8,135,080 B2

OFDM RECEIVER APPARATUS HAVING A PLURALITY OF RECEIVER CIRCUITS AND OFDM RECEIVING METHOD

CROSS REFERENCE TO RELATED APPLICATIONS

This application is based upon and claims the benefit of priority from the prior Japanese Patent Application No. 2007-263987, filed on Oct. 10, 2007, the entire contents of which are incorporated herein by reference.

BACKGROUND OF THE INVENTION

1. Field

The embodiments relate to an OFDM receiver apparatus for receiving OFDM signals by using a plurality of receiver circuits and OFDM receiving method.

2. Description of the Related Art

In digital modulation using a single carrier wave (hereinafter referred to as the carrier), a symbol period becomes shorter as the transfer rate becomes higher. For that reason, signal demodulation may be difficult under multipath environments. Note that a term multipath, in general, means an environment in which radio waves transmitted from a transmitter station reaches a receiver station via plural paths, and this is created by, for example, reflection at obstacles. An environment similar to the multipath is created in communications systems in which radio waves carrying the same signal from plural transmitter stations are simultaneously transmitted. Therefore, the "multipath environment" used in the following description includes the above two environments.

Orthogonal Frequency Division Multiplexing (OFDM) is proposed as one of transmission systems that are intended to improve reception performance under the multipath environment. In OFDM, data is transmitted by utilizing plural carriers orthogonal to each other on a frequency axis. For that reason, a symbol period of data transmitted by each carrier becomes longer and therefore reception performance degradation is smaller even under a multipath environment with large delays. In addition, modulation methods can be changed for each carrier in OFDM.

A modulation employing IFFT (Inverse Fast Fourier Transform) and a demodulation employing FFT (Fast Fourier Transform) are performed in OFDM. For that reason, OFDM has high use efficiency of frequency, and application to digital terrestrial broadcasting has been widely discussed. In Japan, OFDM has been employed in ISDB-T (Integrated Services Digital Broadcasting-Terrestrial), one of the digital terrestrial broadcasting standards.

FIG. 1 is a diagram illustrating a configuration of a conventional OFDM receiver apparatus. The OFDM receiver apparatus receives and demodulates OFDM signals. The OFDM signals transmit data using plural carriers, as shown in FIG. 2. In an example shown in FIG. 2, scattered pilot (SP) signals are allocated at certain frequency intervals. In the ISDB-T, 432 carrier waves are multiplexed, and the SP signals are allocated at every 12-carrier cycles on a frequency axis and are allocated at every 4-symbol cycles on a time axis.

The OFDM signals are received by a tuner 101 and converted into digital signals by an A/D converter 102. An orthogonal demodulator 103 generates orthogonal signals (I-component signal and Q-component signal) from the digital signals obtained in the A/D converter 102. An FFT unit 104 converts time-domain signals into frequency-domain signals by executing FFT operation for each symbol. A transmission path equalizer 105 corrects phase rotation that occurred in the transmission paths. An error correction unit 106 executes error correction and regenerates transmission data.

An IFFT unit 107 converts the frequency-domain signals output from the FFT unit 104 into time-domain signals. A delay information extraction unit 108 generates a delay profile serving as delay information based on the time-domain signals output from the IFFT unit 107. The delay profile represents changes in reception power on time axis. The delay information extraction unit 108 generates FFT window control instruction that is for instructing the position of an FFT window (i.e. FFT start timing) based on the delay profile and provides the instruction to the FFT unit 104. The FFT unit 104 executes FFT operation for each symbol according to the FFT window control instruction.

In order to improve reception performance under the multipath environment, OFDM further introduces guard intervals. The guard intervals are explained in the following descriptions with reference to FIG. 3A and FIG. 3B. In FIG. 3A and FIG. 3B, under a multipath environment in which a main wave (a desired wave) and its delay wave (an interfering wave or an undesired wave) are present, the FFT operation on a symbol n of a received OFDM signal is to be executed.

The FFT operation is executed by information in the FFT window set on the time axis being input to the FFT unit 104. The width of the FFT window corresponds to one symbol time. Assume that, at that time, the guard intervals are not inserted between the symbols. Then, as shown in FIG. 3A, when retrieving the information of the symbol n in the main wave, not only the information of the symbol n in the delay wave but also the information of the symbol n−1 of the delay wave is retrieved. In other words, data of the symbol n is regenerated based on the information of the symbol n and the information of the symbol n−1. As a result, inter-symbol interference occurs and reception quality is degraded.

In view of this problem, OFDM has guard intervals inserted between symbols as shown in FIG. 3B. A guard interval i (i is a number for identifying each symbol) is obtained by copying the information in the end of the symbol i. Note that in the mode 3 of the ISDB-T, the guard interval is 1/8 symbol period.

As shown in FIG. 3B, if the FTT window is set at the symbol timing of the main wave, the information of the symbol n in the delay wave and the information of the guard interval n of the delay wave are also retrieved when retrieving the information of the symbol n in the main wave. However, the information of the guard interval n is obtained by copying a part of the information of the symbol n. In this case, therefore, the FFT operation is executed only on the information of the symbol n. As a result, the inter-symbol interference does not occur and therefore the reception quality is improved.

Depending on the communications system configurations, OFDM receiver apparatus may receive main wave and its preceding waves. The preceding waves may be present in systems such as SFN (Signal Frequency Network) in which the same signals are transmitted from plural transmitter stations simultaneously.

When the preceding waves are present, as shown in FIG. 4A, if the FFT window is controlled at the symbol timing of the main wave, inter-symbol interference occurs. In other words, when retrieving the information of the symbol n in the main wave, not only the information of the symbol n in the preceding wave but also the information of the symbol n+1 in the preceding wave is retrieved. For that reason, when the preceding wave is present, as shown in FIG. 4B, the FFT window is controlled at the symbol timing of the preceding wave. By doing so, obtained demodulated data is based only on the information of the target symbol.

In addition, diversity reception is known as one of technologies to improve the communication quality, although its application is not limited to OFDM. In diversity reception, the same signals are received using plural receiver circuits. In selection diversity, a signal with the best communication quality is selected and output. In combining diversity, plural received signals are combined and transmission data is regenerated from the combined signals.

It should be noted that Patent Document 1 (Japanese Patent Application Publication No. 2003-229833) discloses a technology for controlling FFT windows in a diversity reception circuit. An FFT common window period calculation unit calculates an FFT common window period in which inter-symbol interference of an OFDM signal included in two or more antenna signals becomes minimum.

Patent Document 2 (Japanese Patent Application Publication No. 2005-150935) discloses a configuration for switching a master branch and a slave branch in a diversity receiver apparatus.

Patent Document 3 (Japanese Patent Application Publication No. 2006-229323) discloses a configuration for setting the position of an FFT window based on delay profile signals and signals indicating presence/absence of ghost.

In OFDM, as described above, by inserting a guard interval between symbols, degradation of the reception quality is reduced under a multipath environment. However, even if guard intervals are provided, inter-symbol interference cannot be prevented under an environment in which multipath delay is larger than the guard intervals, and the communication quality is deteriorated. However, depending on the modulation methods (e.g. in a case of a low multilevel modulation such as BPSK or QPSK), even if the multipath delay is larger than the guard intervals, signals can be received as long as the position of the FFT window is set properly. Therefore, it is important to properly set the position of FFT windows. Note that in the following description, the term "multipath delay" includes "time difference between preceding wave and main wave" and "time difference between main wave and delay wave".

Control of FFT windows in the configuration shown in FIG. 1 is performed as described below. SP signals are extracted from output signals of the FFT unit 104. The IFFT unit 107 obtains time-domain signals by executing the IFFT operation on the SP signals. The delay information extraction unit 108 generates a delay profile from the time-domain signals. If the preceding waves are not present, as shown in FIG. 3A and FIG. 3B, an FFT window is set at the symbol timing of the main wave. Meanwhile, if the preceding wave is present, as shown in FIG. 4B, an FFT window is set at the symbol timing of the preceding wave. As described above, control of FFT windows differs depending on whether the preceding wave is present or not.

The SP signals used for generating the delay profile, however, are inserted at three-carrier intervals in the example shown in FIG. 2. In such a case, detectable delay (i.e. a range in which FFT/IFFT operations can be executed) is 1/3 symbol period. Given that one symbol period is 1.008 ms (mode 3 of the ISDB-T), spreading of delay would be 336 µs. In consideration that both of the preceding waves and delay waves are present, detectable delay is ±1/6 symbol period (±168 µs).

Assume that, as shown in FIG. 5A, 200-µs delay wave is present. The detectable delay here is ±168 µs. The delay wave, then, is detected as "preceding wave of 136 µs" in the delay profile obtained from the operation result of the IFFT unit 108 as shown in FIG. 5B due to the FFT/IFFT characteristics. In other words, in this case, whether a 200-µs delay wave is present or a 136-µs delay wave is present cannot be identified.

As a result, although a 200-µs delay wave is present in reality, if the position of FFT windows is determined assuming that a 136-µs preceding wave is present, communication quality would be deteriorated by inter-symbol interference.

As explained above, because the position of FFT windows cannot be determined properly, communication quality may be deteriorated when the multipath delay is large.

SUMMARY

According to one of an aspect of an embodiment, an OFDM receiver apparatus has a plurality of receiver circuits. Each of the receiver circuits includes a Fourier transform circuit for receiving an OFDM signal transmitted by OFDM (Orthogonal Frequency Division Multiplexing), performing Fourier transform on the OFDM signal after being orthogonally demodulated, and outputting the frequency-domain OFDM signal, a delay amount detection circuit for detecting a first delay amount of a transmission path from a scattered pilot information in the frequency-domain OFDM signal, and a window control circuit for determining whether the first delay amount detected by the delay amount detection circuit is proper or not based on peak position information obtained from the frequency-domain OFDM signal converted by the Fourier transform circuit and OFDM signals in the previous and subsequent symbols, calculating a second delay amount from the first delay amount when the first delay amount is determined to be improper, and setting a position of a time window indicating a range of the OFDM signal to be converted with Fourier transform by the Fourier transform circuit using either the first delay amount or the second delay amount.

According to another aspect of the embodiment, an OFDM receiver apparatus has a plurality of OFDM receiver circuits. Each of the plurality of OFDM receiver circuits includes a Fourier transform circuit generating a frequency-domain signal by performing Fourier transform on an OFDM signal. A first OFDM receiver circuit of the plurality of OFDM receiver circuits comprises: a detection unit for detecting a time difference between a desired wave and an undesired wave using the frequency-domain signal; a decision unit for determining whether the undesired wave is a preceding wave or a delay wave; and a generation unit for generating window information for controlling a time range in which Fourier transform is performed on the OFDM signal based on a determination result obtained from the decision unit and the time difference detected by the detection unit. The Fourier transform circuit of the first OFDM receiver circuit and the Fourier transform circuit of a second OFDM receiver circuit of the plurality of OFDM receiver circuits performs Fourier transform on the OFDM signal in accordance with the window information generated by the generation unit.

BRIEF DESCRIPTION OF THE DRAWINGS

FIG. 3A and FIG. 3B are diagrams explaining guard interval;

FIG. 4A and FIG. 4B are diagrams explaining FFT window control when a preceding wave is present;

FIG. 6 is a diagram illustrating a configuration of the OFDM receiver circuit of the embodiment;

FIG. 7A and FIG. 7B are examples of delay profiles;

FIG. 8 is a diagram explaining peak position information;

FIG. 9A and FIG. 9B are diagrams showing waveforms of the peak position information when undesired wave is present;

FIG. 10 is a flowchart showing operations of the OFDM receiver circuit;

FIG. 11A-FIG. 11F are diagrams explaining signals detected based on the delay profile;

FIG. 12 is a diagram illustrating the OFDM receiver apparatus of the embodiment;

FIG. 13A and FIG. 13B are flowcharts showing the operations of the OFDM receiver apparatus;

FIG. 14 is a flowchart of procedures to control the diversity operation;

FIG. 15 is a diagram illustrating a configuration of a four-branch OFDM receiver apparatus.

DESCRIPTION OF THE EMBODIMENTS

<OFDM Receiver Circuit>

The OFDM receiver apparatus of the embodiment includes plural OFDM receiver circuits. Each of the OFDM receiver circuits has basically the same configuration. Each OFDM receiver circuit receives the same OFDM signals. In the following description, the configuration and operations of the OFDM receiver circuits are explained first.

Figure 1:
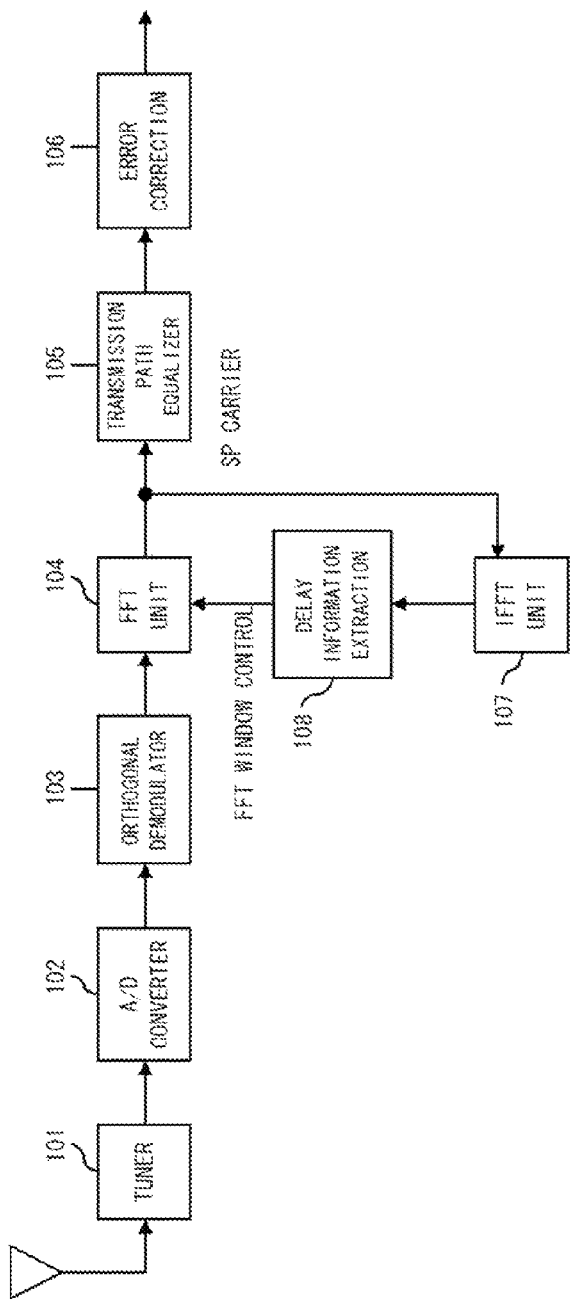
FIG. 1 is a diagram illustrating a configuration of a conventional OFDM receiver apparatus.

FIG. 6 is a diagram illustrating the configuration of an OFDM receiver circuit in the OFDM receiver apparatus of the embodiment. The OFDM receiver circuit includes a tuner 101, an A/D converter 102, an orthogonal demodulator 103, an FFT unit 104, a transmission path equalizer 105, an error correction unit 106, an IFFT unit 107, a delay information extraction unit 108, and an FFT window control unit 1. Basically, configurations and operations of the tuner 101, the A/D converter 102, the orthogonal demodulator 103, the FFT unit 104, the transmission path equalizer 105, the error correction unit 106, the IFFT unit 107, and the delay information extraction unit 108 are the same as those explained with reference to FIG. 1.

The FFT window control unit 1 is provided with delay information (delay profile) generated by the delay information extraction unit 108, peak position information, MER information, and BER information. Based on the provided information, the FFT window control unit 1 generates an FFT window control instruction (time window information or FFT window information) for controlling a time range during which Fourier transform is to be performed to OFDM signals.

The delay profile is generated from the time-domain information obtained by the IFFT unit 107. The IFFT unit 107, at that time, converts frequency-domain information output from the FFT unit 104 into time-domain information.

FIG. 7A is an example of the delay profile in a case that a delay wave is present. In general, the delay wave is generated by multipath. The delay wave may be generated when the same signals are broadcasted from plural transmitter stations simultaneously. FIG. 7B is an example of the delay profile when the preceding wave is present. The preceding wave can be mainly generated when the same signals are broadcasted from plural transmitter stations simultaneously. Delay information indicates time difference between a main wave (desired wave) and an undesired wave (including the preceding wave and delay wave). Here, the time difference between the main wave and the delay wave is represented by a "positive value", and the time difference between the main wave and the preceding wave is represented by a "negative value".

The peak position information is generated by using the guard intervals inserted between symbols. In order to obtain the peak position information, first, correlation between an OFDM signal output from the orthogonal demodulator 103 and a signal of the delayed OFDM signal is acquired. Delay time is one symbol time. The peak position information can be obtained by calculating a moving average of the correlation value of these signals. The moving range of the moving average is, for example, a guard interval.

In FIG. 8, during a period P1, a correlation between the symbol n and the symbol n-1 is calculated. In this case, the correlation value is small. During a period P2, a correlation between the symbol n and the guard interval n is calculated. Here, the signal of the guard interval n is obtained by copying the signal of the symbol n. In other words, a correlation between the symbol n and the symbol n is calculated during the period P2, the correlation should be therefore large. The moving average of the correlation value increases during the period P2. During a period P3, a correlation between a guard interval n+1 and the symbol n is calculated. In this case, the correlation is small. The moving average decreases in the period P3. As a result, the moving average of the correlation value has its peak at the timing when the period P2 is switched to the period P3.

The moving average of the correlation value has its peak at the boundary timing between symbols of the OFDM signals. The peak position information represents the timing when the moving average has its peak. Note that the peak position information is used in the existing OFDM receiver circuits to detect the FFT window position (or to detect symbol timing).

The waveforms of the peak position information change in accordance with the presence of the undesired waves (i.e. interference waves). The waveforms vary depending on whether the undesired wave is preceding wave or delay wave. In other words, when a preceding wave is present, as shown in FIG. 9A, the time period in which the moving average of the correlation value increases from zero to its peak is longer than the time period in which the moving average decreases from the peak to zero. On the other hand, when a delay wave is present, as shown in FIG. 9B, the time period in which the moving average increases from zero to its peak is shorter than the time period in which the moving average decreases from the peak to zero. Accordingly, it is possible to determine whether an undesired wave is a preceding wave or a delay wave based on the peak position information. However, accuracy of this determination is not always high.

The MER (Modulation Error Rate) information represents MER of a signal, the phase rotation of which is corrected in the transmission path equalizer 105. The MER information is generated by the transmission path equalizer 105 in this embodiment. The BER (Bit Error Rate) information represents BER of regenerated transmission data. The BER information is generated by the error correction unit 106 in this embodiment. Note that because detection of the MER and BER can be realized by known technologies, detailed explanation of the detection is omitted.

FIG. 10 is a flowchart showing the operations of the OFDM receiver circuit. The processes on the flowchart are executed by the FFT window control unit 1.

Figure 2:
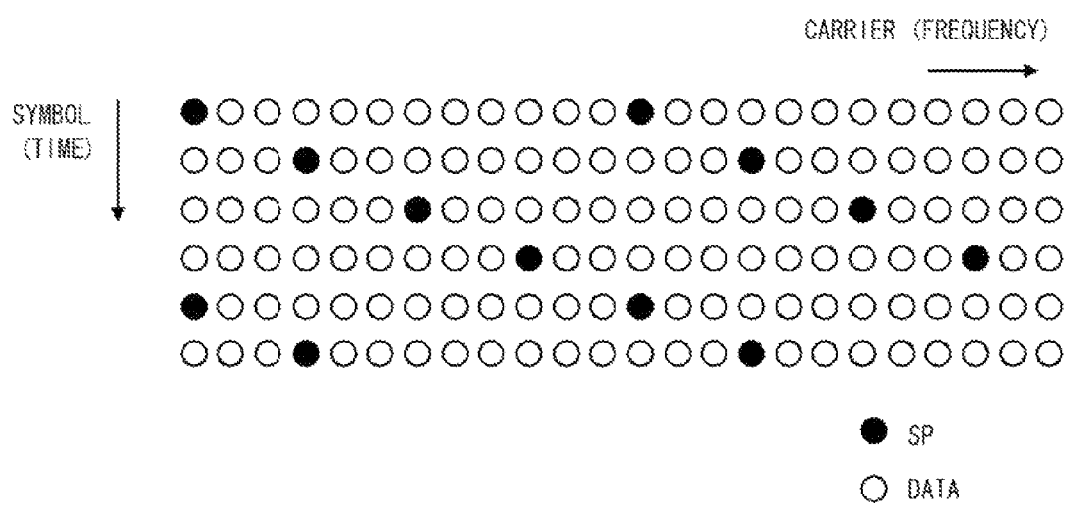
FIG. 2 is a diagram explaining allocation of OFDM signals and pilot signals.
Figure 5A:
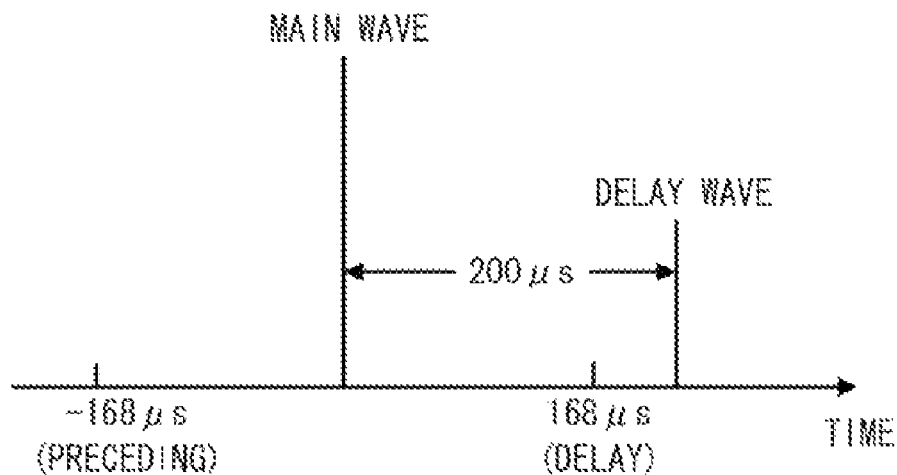
FIG. 5A and FIG. 5B are diagrams explaining a relationship between a preceding wave and a delay wave detected by IFFT.
Figure 5B:
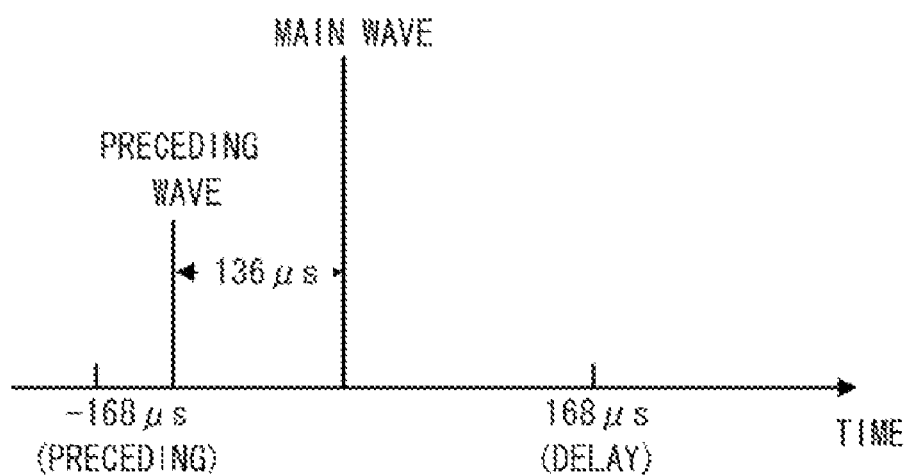

Assume that in the following description, OFDM signals shown in FIG. 2 are received. That is, the SP signals are allocated at every 12 carriers on a frequency axis and are allocated at every 4 symbols on a time axis. A delay profile is generated using the SP signals. In addition, the symbol period is 1008 μs. As explained with reference to FIG. 5A and FIG. 5B, the detectable range with the delay profile (i.e. a range in which FFT/IFFT operation can be executed) is 1/3 symbol period (i.e. 336 μs). In consideration that both of a preceding wave and a delay wave can be present, the detection range is "±1/6 symbol period (±168 μs)".

FIG. 11A-FIG. 11F are diagrams explaining signals detected based on the delay profile. If a delay wave is present within the detection range, as shown in FIG. 11A, the delay wave is detected by the delay profile. Similarly, if a preceding wave is present within the detection range, as shown in FIG. 11B, the preceding wave is detected by the delay profile.

However, as shown in FIG. 11C, if an amount of delay of the delay wave exceeds the detection range, according to the delay profile, the delay wave is detected as a preceding wave within the detection range. Here, the time difference between a main wave and a delay wave is represented by a "positive value" and the time difference between a main wave and a preceding wave is represented by a "negative value". In addition, assume that the amount of delay of the delay wave is "168+a" μs. According to the delay profile, as shown in FIG. 11C, a "−168+a" μs preceding wave is detected. In other words, when a "−168+a" μs preceding wave is detected based on the delay profile, the information of the delay profile is not sufficient to identify whether a "168+a" μs delay wave is present or a "−168+a" μs preceding wave is present.

The same is true on a case in which the time difference between a preceding wave and a main wave exceeds the detection range. AS shown in FIG. 11D, if a "−168−a" μs preceding wave is present, the preceding wave is detected as a "168−a" μs delay wave.

Assume that according to the delay profile, a preceding wave with a small time difference c (=168-b) from the main wave is detected. In such a case, whether a "c" μs preceding wave is present or a "168+b" μs delay wave is present cannot be identified based on the delay profile. However in general, the maximum value of possible amounts of delay is basically determined by the system configuration (such as, locations of each transmitter station). If "168+a" exceeds a threshold (i.e. if "c" is smaller than a threshold), a probability of such a delay wave being present can be ignored. Accordingly, in this case, based on the delay profile, it is determined that a "c" μs preceding wave is present.

As described above, when the time difference between the main wave and the preceding wave is smaller than the threshold, it is determined that the detected preceding wave is actually present based on the delay profile. Similarly, as shown in FIG. 11F, when a delay wave with the amount of delay being smaller than the threshold is detected, it is determined that the detected delay wave is actually present.

In the following description, a flowchart of FIG. 10 is explained. Processes of the flowchart determine the position of the FFT window. As explained with reference to FIG. 11A-FIG. 11F, whether the undesired wave is a preceding wave or a delay wave cannot be identified only with the delay profile. The processes in the flowchart include processing to determine whether the undesired wave is a preceding wave or a delay wave.

In step S1, first, the position of the FFT window is controlled based on the delay profile. In other words, if a preceding wave is present, as shown in FIG. 4B, the position of the FFT window is controlled at symbol timing of the preceding wave. If a preceding wave is not present, as shown in FIG. 3B, the position of the FFT window is controlled at symbol timing of the main wave. Note that control of the FFT window is realized by providing the FFT window control instruction to the FFT unit 104 that executes the FFT operation in accordance with the instruction.

Next, while in a state that the FFT window is controlled as above, the time difference between the main wave and the undesired wave is detected. If the time difference is smaller than a threshold, it is determined that the detected undesired wave is actually present, and the process proceeds to step S5. In this case, in step S5, it is determined that the FFT window control in step S1 is proper. Note that the threshold to evaluate the time difference between the main wave and the undesired wave is not limited in particular, but 84 μs, for example. In this case, a probability that an undesired wave with time difference from the main wave being larger than 252 μs is present can be ignored. On the other hand, when a delay wave with 84-168 μs time difference from the main wave is detected, presence of a 168-252 μs preceding wave should be considered, and when a preceding wave with 84-168 μs time difference from the main wave is detected, presence of a 168-252 μs delay wave should be considered.

While in the above state in which the FFT window is controlled, communication quality (transmission path information) is detected. The communication quality is indicated by MER and/or BER in this embodiment. If the communication quality is better than a certain level, the process proceeds to step S5. In this case, in step S5, it is determined that the FFT window control in step S1 is proper.

In step S1, if the time difference between the main wave and an undesired wave is larger than the threshold, or the communication quality is worse than a certain level, steps 2 is executed. In step S2, whether the undesired wave is a preceding wave or a delay wave is determined using the peak position information. The method for determining whether the undesired wave is a preceding wave or a delay wave using the peak position information is already explained with reference to FIG. 9A and FIG. 9B. According to the determination, the position of the FFT window is controlled. In other words, when it is determined that the undesired wave is a delay wave, the FFT window is controlled at symbol timing of the main wave. Meanwhile, when it is determined that the undesired wave is a preceding wave, the FFT window is controlled at symbol timing of the preceding wave.

The FFT unit 104 executes the FFT operation at the FFT window determined in accordance with the peak position information. The communication quality is checked while in the state that the FFT window is so controlled.

As a result of controlling the FFT window according to step S2, if the communication quality is worse than a certain level, it is estimated that the determination in step S2 may be an error. In such a case, inversion processing is performed in step S3. In other words, when the undesired wave is determined to be a delay wave in step S2, in step S3, the FFT window is controlled under the assumption that the undesired wave is a preceding wave. For example, if the FFT window is controlled under the assumption that a "168+x" delay wave is present in step S2, the FFT window is controlled under the assumption that a "−168+x" preceding wave is present in step S3. In this case, the FFT window is controlled at symbol timing of a "−168+x" preceding wave. Similarly, if the undesired wave is determined to be a preceding wave in step S2, the FFT window is controlled under the assumption that the undesired wave is a delay wave in step S3. For example, if the FFT window is controlled under the assumption that a "−168−x" preceding wave is present in step S2, the FFT window is controlled under the assumption that a "168−x/" delay wave is present in step S3. In this case, the FFT window is controlled at symbol timing of the main wave.

The FFT unit 104 executes the FFT operation at the FFT window determined in step S3. The communication quality is checked while in the state that the FFT window is so controlled.

The communication quality obtained in the FFT window determined in step S2 is compared with the communication quality obtained in the FFT window determined in step S3 in step S4, and which of the FFT windows is more proper is determined. In other words, the FFT window from which higher communication quality can be obtained is selected. In step S5, the determination result obtained in step S4 is stored. Afterwards, the FFT window is controlled in accordance with the determination result.

It should be noted that the position of the FFT window is determined in steps S1-S5, the FFT operation is performed in the same state for every symbol. At that time, the communication quality is continuously monitored. The latest delay profile is generated. If the communication quality becomes lower than a certain level for more than a predetermined time period, the process returns to step S1 and re-executes the FFT window control. In addition, if the amount of delay detected from the delay profile (time difference between a main wave and an undesired wave) is smaller than a threshold, the process also returns to step S1 and re-executes the FFT window control.

As described above, the OFDM receiver circuit of the embodiment generates a FFT window control instruction based on delay information (delay profile), peak position information, MER information, BER information. The FFT unit 104 executes FFT operation on the OFDM signal for every symbol, in accordance with the FFT window control instruction. Note that the configuration and operations of the above-described OFDM receiver circuit are also described in Japanese Patent Application Publication No. 2006-152530.

However, to determine the proper FFT window position, this method basically performs both of a procedure to monitor the communication quality by using an FFT window for a case that the undesired wave is delay wave and a procedure to monitor the communication quality by using an FFT window for a case that the undesired wave is preceding wave. In other words, before the proper FFT window position is determined there is a time period during which OFDM signals are received at wrong FFT window position. The communication quality of the OFDM signals received in such a time period is low.

The OFDM receiver apparatus of the present embodiment has a configuration and functions to solve the above problem. In the following description, the OFDM receiver apparatus of the present embodiment is explained.

<OFDM Receiver Apparatus of the Embodiment>

FIG. 12 is a diagram showing the configuration of the OFDM receiver apparatus of the embodiment. The OFDM receiver apparatus of the present embodiment includes plural OFDM receiver circuits. The embodiment shown in FIG. 12 has two OFDM receiver circuits (a master branch circuit 10 and a slave branch circuit 20). The configuration and operations of each OFDM receiver circuit are basically the same, and are explained with reference to FIG. 6. However, operations of a FFT window control unit 1M in a master branch are different from those of a FFT window control unit 1S in a slave branch. The difference of these operations is explained later.

A diversity combining unit 2 performs diversity combining of a pair of signals output from each of transmission path equalizers 105 in the master branch and in the slave branch. Note that although diversity combining is performed in this embodiment, selection diversity can be performed. The error correction unit 3 corrects errors of the output signals of the diversity combining unit 2. Consequently, transmission data is obtained from the output signals of the error correction unit 3.

FIG. 13A is a flowchart showing the operations of the slave branch FFT window control unit 1S. Operation sequence of the FFT window control unit 1S is basically the same as the sequence shown in FIG. 10. In other words, the operation sequence of the FFT window control unit 1S includes procedures to determine whether an undesired wave is a delay wave or a preceding wave (steps S3-S4). In addition, the FFT window control unit 1S notifies the master branch FFT unit 1M of the determination result (step S11).

FIG. 13B is a flowchart showing the operations of the master branch FFT window control unit 1M. In the master branch, the FFT window control unit 1M waits for the determination result obtained in the slave branch (step S21) after the control of the FFT window in steps S1-S2 without executing the inversion processing in step S3. In the master branch, in this time period, the FFT operation is executed at the FFT window determined in the steps S1-S2. When receiving the determination result from the slave branch FFT window control unit 1S, the master branch FFT window control unit 1M determines the position of the FFT window of the master branch in accordance with the determination result.

The determination result that the slave branch notifies the master branch is, for example, information indicating whether an undesired wave is a delay wave or a preceding wave. In this case, the master branch FFT window control unit 1M determines the position of the FFT window in accordance with the delay profile and peak position information detected in the master branch and the notified determination result. In other words, if the determination in the master branch (steps S1-S2: delay wave or preceding wave) in accordance with the peak position information matches the ultimate determination of step S4 in the slave branch, the master branch does not change the FFT window determined by the peak position information. Meanwhile, if those determinations do not match, the position of the FFT window is changed in the master branch in accordance with the determination of step S4 in the slave branch.

The determination result that the slave branch notifies the master branch may be information indicating the position of the FFT window. In such a case, the master branch controls the FFT window to locate the position notified from the slave branch.

As described above, the OFDM receiver apparatus of the present embodiment determines the optimum position of the FFT window in the slave branch and uses the determination result in the master branch. As a result, the master branch can search for the proper FFT window position without erroneous FFT window control. Accordingly, deterioration of the communication quality can be reduced.

FIG. 14 is a flowchart of the procedures to control the diversity operations. The processing of the flowchart is executed by the slave branch FFT control unit 1S at a certain time intervals, for example.

In step S31, whether the inversion processing (steps S3-S4) is in execution or not is checked. If the inversion processing is in execution, communication quality (e.g. MER) of the master branch is compared with that of the salve branch. If the master branch has higher communication quality (i.e. the master branch has lower communication quality), a branch mask instruction to instruct stop the diversity combining is issued to the diversity combining unit 2. When receiving the instruction, the diversity combining unit 2 stops the combining operations and transmits only the output signal of the transmission path equalizer 105 in the master branch to the error correction unit 3. By stopping the combining operations, low power consumption can also be realized.

If the inversion processing is not in execution (step S31: No), execution of the diversity combining is instructed. Although the inversion processing is in execution, if the slave branch has higher communication quality than the master branch, the execution of the diversity combining is instructed. In the above two cases, the diversity combining unit 2 combines the output signals of each of the transmission path equalizers 105 in the master branch and in the slave branch, and the combined signal is transmitted to the error correction unit 3.

It should be noted that although the OFDM receiver apparatus of the above embodiment performs the diversity reception, the present invention is not limited to the above configuration. In other words, as an example, the slave branch may be used only for searching for the FFT window position. In such a case, power supply to the slave branch is stopped at the point in time when the FFT window position search is finished. By doing so, high reception performance can be maintained under a multipath environment while lowering the power consumption.

According to the OFDM receiver apparatus of the embodiment, even under an environment in which the time difference between a main wave and an undesired wave exceeds a guard interval, improper FFT operations are eliminated or reduced. As a result, even under an environment with large multipath delays, deterioration of communication quality can be prevented.

<Four-Branch Configuration>

The OFDM receiver apparatus of the embodiment includes plural OFDM receiver circuits. The OFDM receiver apparatus shown in FIG. 12 has two OFDM receiver circuits. However, the number of the OFDM receiver circuits is not limited in particular.

FIG. 15 is a diagram illustrating a configuration of a four-branch OFDM receiver apparatus. Note that descriptions of the functions are omitted in part in FIG. 15, however the configuration of each OFDM receiver circuit is the same as the configuration described above.

In the OFDM receiver apparatus shown in FIG. 15, each of a first branch and a second branch is used for receiving transmission data. A third branch monitors quality of received signals at an FFT window position that is estimated based on the delay profile and the peak position information. Meanwhile a fourth branch monitors quality of received signals at an FFT window position that is obtained by inverting the estimation result using the peak position information. A preceding/delay determination unit 4 determines whether an undesired wave is a preceding wave or a delay wave by comparing the monitoring result of the third branch and that of the fourth branch.

The first through fourth branches are notified of the determination result. Each of the first through fourth branches controls the position of the FFT window in accordance with the notification, and executes the FFT operation on the OFDM signals. Note that while the determination processing is performed in the third and fourth branches, the first branch and the second branch, respectively performs the FFT operation at the FFT window position determined based on the peak position information.

A diversity combining unit 5 combines the signal received in the first branch and the signal received in the second branch. If, however, the reception quality of the third branch and/or that of the fourth branch is/are favorable, signals of those branches may be used for the diversity combining.

Figure 16A:
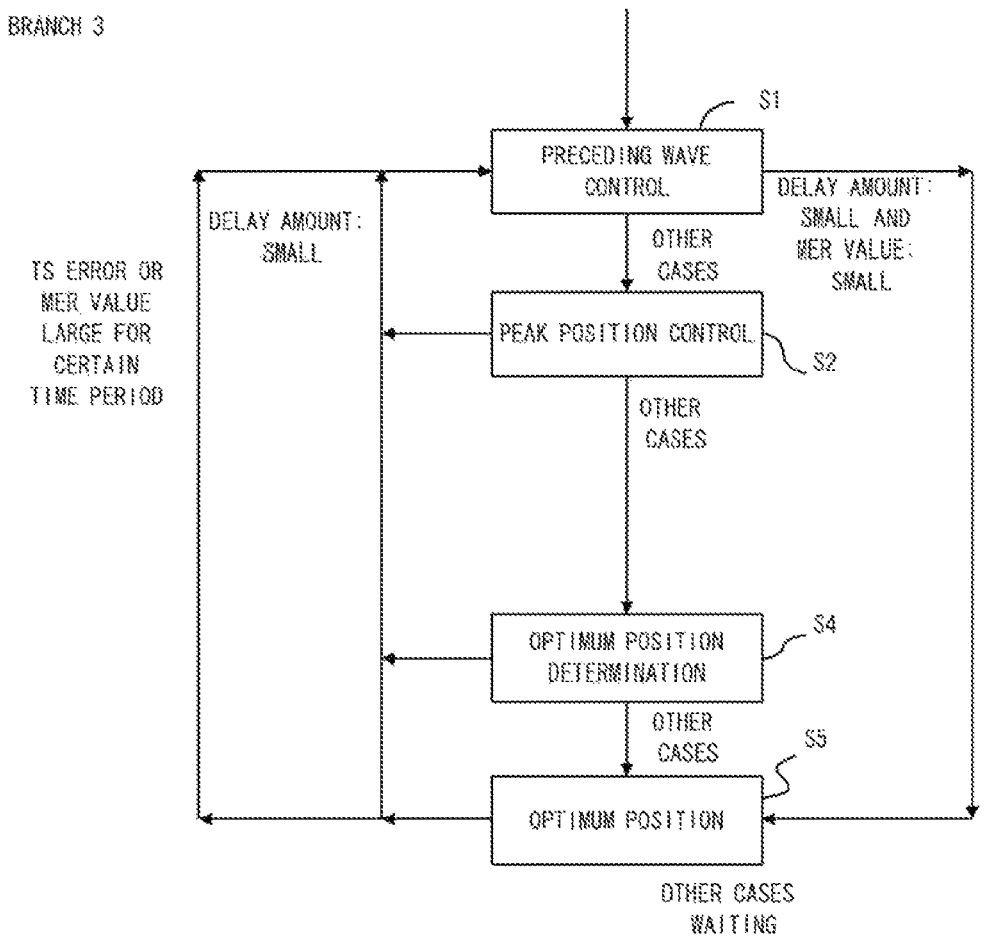
FIG. 16A-FIG. 16C are flowcharts showing the operations of each FFT window control unit.
Figure 16B:
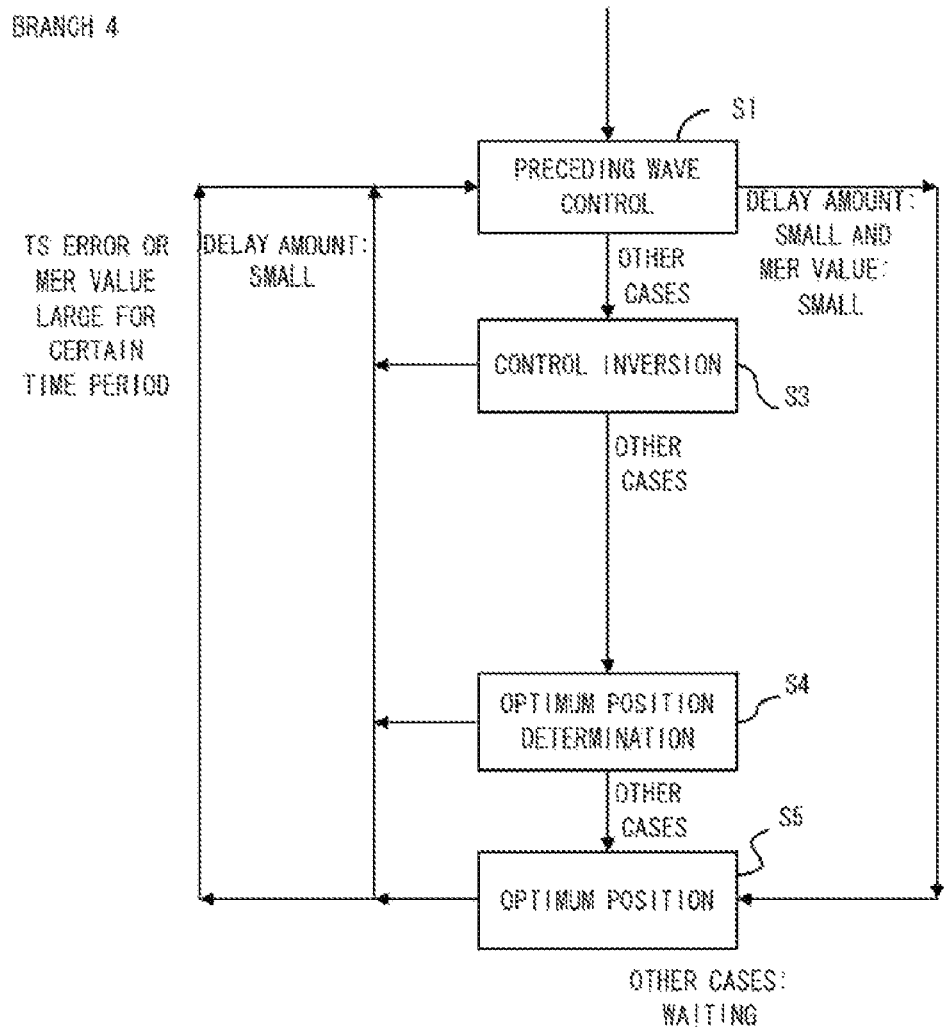
Figure 16C:
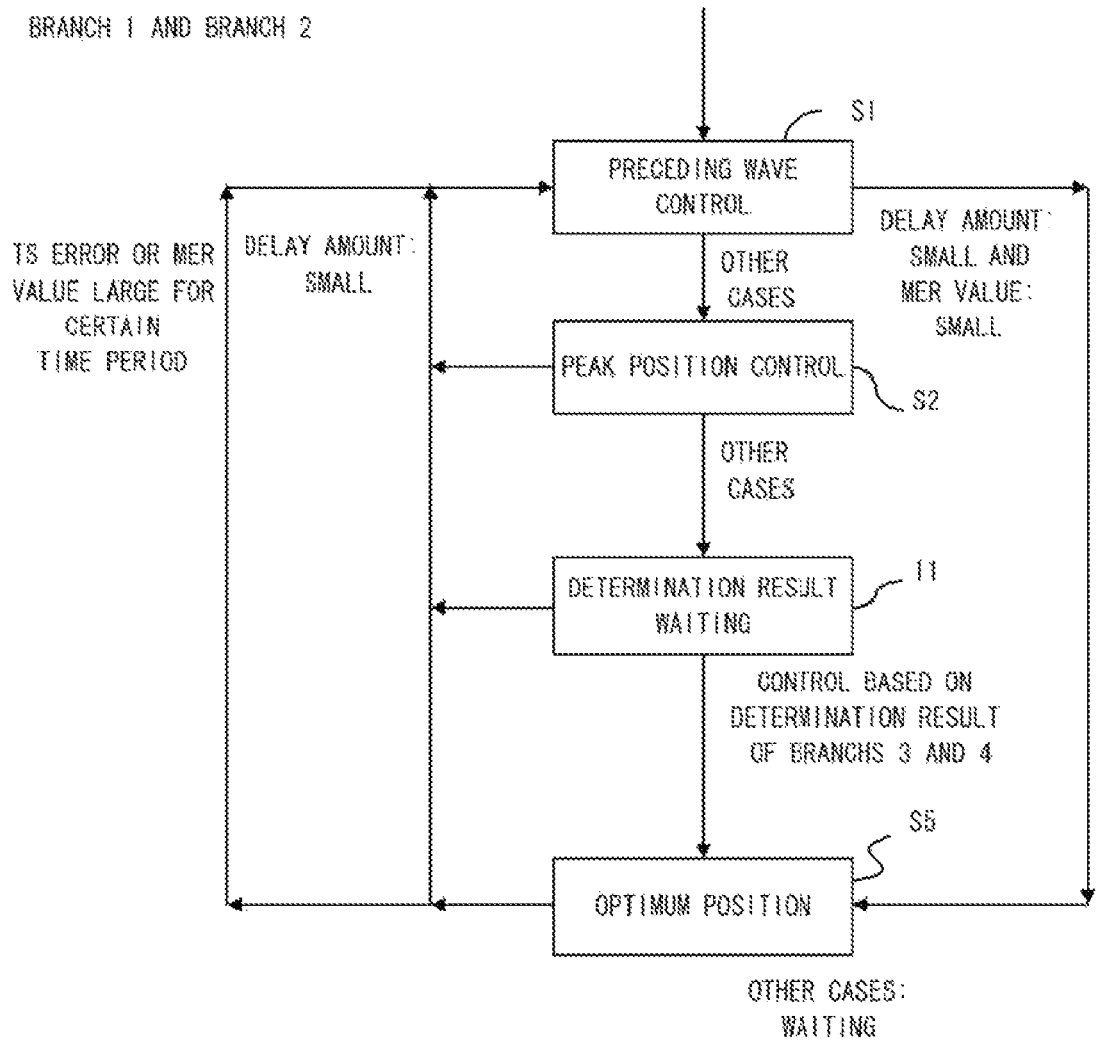

FIG. 16A-FIG. 16C are flowcharts showing the operations of each FFT window control unit in the four-branch OFDM receiver apparatus. In the third branch, as shown in FIG. 16A, the position of the FFT window is controlled in accordance with the peak position information. In the fourth branch, as shown in FIG. 16B, the position of the FFT window is controlled in accordance with the result of the inversion processing. Note that step S4 shown in FIG. 16A and FIG. 16B may be executed by the preceding/delay determination unit 4. In the first and second branches, as shown in FIG. 16C, the FFT window is controlled in accordance with the notification from the preceding/delay determination unit 4.

<Summary>

The OFDM receiver apparatus disclosed in this specification has a plurality of receiver circuits. Each of the receiver circuits includes a Fourier transform circuit for receiving an OFDM signal transmitted by OFDM (Orthogonal Frequency Division Multiplexing), performing Fourier transform on the OFDM signal after being orthogonally demodulated, and outputting the frequency-domain OFDM signal, a delay amount detection circuit for detecting a first delay amount of a transmission path from a scattered pilot information in the frequency-domain OFDM signal, and a window control circuit for determining whether the first delay amount detected by the delay amount detection circuit is proper or not based on peak position information obtained from the frequency-domain OFDM signal converted by the Fourier transform circuit and OFDM signals in the previous and subsequent symbols, calculating a second delay amount from the first delay amount when the first delay amount is determined to be improper, and setting a position of a time window indicating a range of the OFDM signal to be converted with Fourier transform by the Fourier transform circuit using either the first delay amount or the second delay amount.

According to the above configuration, first, whether the first delay amount is proper or not is determined. If the first delay amount is determined to be improper, the second delay amount is calculated and the time window for Fourier transform is controlled based on either the first delay amount or the second delay amount. As a result, it is highly probable that the position of the time window is properly controlled.

In the above OFDM receiver apparatus, the Fourier transform circuit included in a first receiver circuit of the plurality of receiver circuits may set the position of the time window indicating the range of the OFDM signal to be converted with Fourier transform based on a value set by a window control circuit included in a second receiver circuit of the plurality of receiver circuits. According to the above configuration, the first receiver circuit can use the control result of the second receiver circuit. As a result, in the first receiver circuit, determination of which of the first delay amount or the second delay amount is more proper is not necessary.

Another OFDM receiver apparatus disclosed in this specification has a plurality of OFDM receiver circuits. Each of the plurality of OFDM receiver circuits includes a Fourier transform circuit generating a frequency-domain signal by performing Fourier transform on an OFDM signal. A first OFDM receiver circuit of the plurality of OFDM receiver circuits comprises: a detection unit for detecting a time difference between a desired wave and an undesired wave using the frequency-domain signal; a decision unit for determining whether the undesired wave is a preceding wave or a delay wave; and a generation unit for generating window information for controlling a time range in which Fourier transform is performed on the OFDM signal based on a determination result obtained from the decision unit and the time difference detected by the detection unit. The Fourier transform circuit of the first OFDM receiver circuit and the Fourier transform circuit of a second OFDM receiver circuit of the plurality of OFDM receiver circuits performs Fourier transform on the OFDM signal in accordance with the window information generated by the generation unit.

Accordingly, OFDM signals can be received with favorable quality under an environment in which multipath delays are large.

What is claimed is:

1. An OFDM receiver apparatus having a plurality of receiver circuits, wherein each of the receiver circuits comprising:
a Fourier transform circuit configured to receive an OFDM signal transmitted by OFDM (Orthogonal Frequency Division Multiplexing), to perform Fourier transform on the OFDM signal after being orthogonally demodulated, and to output the frequency-domain OFDM signal;
a delay amount detection circuit configured to detect a first delay amount of a transmission path from a scattered pilot information in the frequency-domain OFDM signal; and
a window control circuit configured to determine whether an undesired wave is a preceding wave or a delay wave based on peak position information obtained from the frequency-domain OFDM signal converted by the Fourier transform circuit and OFDM signals in the previous and subsequent symbols, to determine whether the first delay amount detected by the delay amount detection circuit is proper or not, to invert a determination result of whether the undesired wave is the preceding wave or the delay wave and calculate a second delay amount from the first delay amount when the first delay amount is determined to be improper, and to set a position of a time window indicating a range of the OFDM signal to be converted with Fourier transform by the Fourier transform circuit using either the first delay amount or the second delay amount.

2. The OFDM receiver apparatus according to claim 1, wherein
a Fourier transform circuit included in a first receiver circuit of the plurality of receiver circuits sets the position of the time window indicating the range of the OFDM signal to be converted with Fourier transform based on a value set by a window control circuit included in a second receiver circuit of the plurality of receiver circuits.

3. The OFDM receiver apparatus according to claim 1, further comprising a diversity combining unit configured to combine a plurality of demodulated signals output from the plurality of receiver circuits.

4. The OFDM receiver apparatus according to claim 3, wherein
the window control circuit sets the position of the time window by using MER (Modulation Error Rate) information obtained from an output signal of a transmission path equalizer connected to the Fourier transform circuit and BER (Bit Error Rate) information obtained from an output signal of an error correction unit connected to the diversity combining unit.

5. The OFDM receiver apparatus according to claim 1, wherein
determination of whether the first delay amount is proper or not is made when an absolute value of the first delay amount is beyond a predetermined range.

6. An OFDM receiving method comprising:
performing Fourier transform on an OFDM signal transmitted by OFDM (Orthogonal Frequency Division Multiplexing) after receiving and orthogonally demodulating the OFDM signal;
detecting a first delay amount of a transmission path from scattered pilot information in the frequency-domain OFDM signal;
determining whether an undesired wave is a preceding wave or a delay wave based on peak position information obtained from the Fourier transformed frequency-domain OFDM signal and OFDM signals in the previous and subsequent symbols;
determining whether the first delay amount is proper or not, and inverting a determination result of whether the undesired wave is the preceding wave or the delay wave and calculating a second delay amount from the first delay amount when the first delay amount is determined to be improper; and
setting a position of a time window indicating a range of the OFDM signal to be converted with Fourier transform by a Fourier transform circuit using either the first delay amount or the second delay amount.

7. The OFDM receiving method according to claim 6, wherein
determination of whether the first amount of delay is proper or not is made when an absolute value of the first delay amount is beyond a predetermined range.

8. An OFDM receiver apparatus having a plurality of OFDM receiver circuits, wherein
each of the plurality of OFDM receiver circuits includes a Fourier transform circuit configured to generate a frequency-domain signal by performing Fourier transform on an OFDM signal, and wherein
a first OFDM receiver circuit of the plurality of OFDM receiver circuits comprises:
a detection unit configured to detect a time difference between a desired wave and an undesired wave using the frequency-domain signal;
a decision unit configured to determine whether the undesired wave is a preceding wave or a delay wave when the time difference is larger than a threshold; and
a generation unit configured to generate window information for controlling a time range in which Fourier transform is performed on the OFDM signal based on a determination result obtained from the decision unit and the time difference detected by the detection unit, and wherein
the Fourier transform circuit of the first OFDM receiver circuit and the Fourier transform circuit of a second OFDM receiver circuit of the plurality of OFDM receiver circuits perform Fourier transform on the OFDM signal in accordance with the window information generated by the generation unit, and
the decision unit determines whether the undesired wave is a preceding wave or a delay wave based on a comparison result of communication quality when the Fourier transform is performed under the assumption that the undesired wave is a preceding wave and communication quality when the Fourier transform is performed under the assumption that the undesired wave is a delay wave.

9. An OFDM receiver apparatus having a plurality of OFDM receiver circuits, wherein
each of the plurality of OFDM receiver circuits comprises:
a Fourier transform circuit configured to generate a frequency-domain OFDM signal by performing Fourier transform on an OFDM signal;

a detection circuit configured to detect a time difference between a desired wave and an undesired wave based on the frequency-domain signal; and a control circuit configured to generate window information for controlling a time range in which Fourier transform is performed on the OFDM signal based on the time difference detected by the detection circuit and providing the window information to the Fourier transform circuit, and wherein a first OFDM receiver circuit of the plurality of OFDM receiver circuits further comprises a decision unit configured to determine whether the undesired wave is a preceding wave or a delay wave when the time difference is larger than a threshold, the control circuit in a second OFDM receiver circuit of the plurality of OFDM receiver circuits generates the window information using a determination result of the decision unit in the first OFDM receiver circuit, and the decision unit determines whether the undesired wave is a preceding wave or a delay wave based on a comparison result of communication quality when the Fourier transform is performed under the assumption that the undesired wave is a preceding wave and communication quality when the Fourier transform is performed under the assumption that the undesired wave is a delay wave.

* * * * *